(12) United States Patent
Zhang

(10) Patent No.: US 10,336,241 B2
(45) Date of Patent: Jul. 2, 2019

(54) SCREW-DRIVING BIDIRECTIONAL ADJUSTMENT MECHANISM FOR ADJUSTING RELATIVE POSITION OF HIGH AND LOW BEAM SHAPES OF AUTOMOBILE LAMP

(71) Applicant: SHANGHAI KOITO AUTOMOTIVE LAMP CO., LTD, Shanghai (CN)

(72) Inventor: Jie Zhang, Shanghai (CN)

(73) Assignee: SHANGHAI KOITO AUTOMOTIVE LAMP CO., LTD, Shanghai (CN)

( * ) Notice: Subject to any disclaimer, the term of this patent is extended or adjusted under 35 U.S.C. 154(b) by 194 days.

(21) Appl. No.: 15/311,067

(22) PCT Filed: May 12, 2015

(86) PCT No.: PCT/CN2015/078721
§ 371 (c)(1),
(2) Date: Nov. 14, 2016

(87) PCT Pub. No.: WO2015/180563
PCT Pub. Date: Dec. 3, 2015

(65) Prior Publication Data
US 2017/0106782 A1    Apr. 20, 2017

(30) Foreign Application Priority Data

May 26, 2014 (CN) ............................ 2014 1 0226335
May 26, 2014 (CN) ..................... 2014 2 0273434 U

(51) Int. Cl.
  B60Q 1/00    (2006.01)
  B60Q 1/068   (2006.01)
  B60Q 1/076   (2006.01)

(52) U.S. Cl.
  CPC ........... *B60Q 1/0683* (2013.01); *B60Q 1/076* (2013.01); *B60Q 2200/32* (2013.01)

(58) Field of Classification Search
  CPC ........ B60Q 1/0683; B60Q 1/06; B60Q 1/076; B60Q 2200/38
  USPC ....................................................... 362/507
  See application file for complete search history.

(56) References Cited

U.S. PATENT DOCUMENTS

| 7,926,992 B2 * | 4/2011 | Kim ...................... F21S 41/698 |
| | | 362/539 |
| 8,920,008 B2 * | 12/2014 | Kim ...................... B60Q 1/076 |
| | | 362/513 |
| 9,434,295 B2 * | 9/2016 | Shin ......................... B60Q 1/04 |

* cited by examiner

*Primary Examiner* — Andrew J Coughlin
(74) *Attorney, Agent, or Firm* — CBM Patent Consulting, LLC

(57) ABSTRACT

A screw-driving bidirectional adjustment mechanism for adjusting the relative position of the high and low beam shapes of an automobile lamp, comprising an open box-shaped sliding groove fixedly connected with a low beam assembly unit and a high beam assembly unit which is rotationally fitted with the low beam assembly unit, has one end capable of being moved through a shift lever, and is connected to a sliding block assembly.

10 Claims, 8 Drawing Sheets

SCREW-DRIVING BIDIRECTIONAL ADJUSTMENT MECHANISM FOR ADJUSTING RELATIVE POSITION OF HIGH AND LOW BEAM SHAPES OF AUTOMOBILE LAMP

This application is the U.S. national phase of International Application No. PCT/CN2015/078721 Filed on 24 Apr. 2015 which designated the U.S. and claims priority to Chinese Application Nos. CN 201410226335.5 and CN 201420273434.4 filed on 26 May 2014, the entire contents of each of which are hereby incorporated by reference.

TECHNICAL FIELD

The present invention relates to an automatic lamp device. Specifically, the present invention relates to an automobile lamp adjusting device. More specifically, the present invention relates to a screw-driving bidirectional adjustment mechanism for adjusting the relative position of the high and low beam shapes of an automobile lamp. The screw-driving bidirectional adjustment mechanism for adjusting the relative position of the high and low beam shapes of an automobile lamp adjusts the relative position of the high and low beam shapes of the automobile lamp by performing bidirectional adjustment on a high beam unit or a low beam unit of the automobile lamp, meeting the demands of sites with specific requirements for the relative position of the high and low beam shapes of the automobile lamp.

BACKGROUND OF THE INVENTION

The main objective of setting automobile lighting lamps is to provide the best visual effects for drivers during running. This requires that the lamps have the optimal lighting effects. However, in actual road and traffic circumstances, when two cars running in opposite directions meet each other, the strong light of a front lamp makes drivers dazzled, causing the danger of generating traffic accidents.

To solve this problem, the currently employed solution is to switch high and low beams. Different front lighting lamps are used upon different situations to solve the above problem. The majority of the existing cars are equipped with combined lamps, which means that lamps, including front lamps, front steering lamps, etc. are integrated as a whole to facilitate disassembling, assembling and washing.

The design of the combined lamp is limited in space, promoting the integration of high and low beams of the front lamp. The high and low beams share one light source, and the high and low beams are switched by adjusting an inner structure during running.

However, once a switching malfunction occurs, either the high beam or the low beam will not work, greatly trending to cause traffic accidents. Thus it can be seen that, switching of the high and low beams of the automobile lamps is very important, and can directly influence the running safety of the car.

For this reason, various devices for switching high and low beams have been researched and developed.

For example, a Chinese utility model patent, application No. "200720129230.3", discloses a high-and-low-beam switching device, characterized in that, a fixed baffle is disposed at the front edge of a reflector mirror; an adjusting device includes an electromagnetic valve and a movable baffle; the electromagnetic valve is provided with a movable rod to be connected with the movable baffle; the movable baffle is connected with the fixed baffle through a pivot assembly to serve as the rotating shaft of the movable baffle through the pivot assembly; and the movable baffle extends to form a connecting arm which is vertical to the main body of the movable baffle, to be connected with the movable rod of the electromagnetic valve.

However, according to the high-and-low-beam switching device of the utility model patent, the component structure is relatively complicated, and the main purpose is to reduce the power consumption and temperature rise, so the device fails to meet the combined functional requirements of flexible switching and simple structure.

Besides, so far, to adjust the relative position of components in the existing automobile lamps, the following method is employed in most cases: the relative position of two points of two components is fixed, and the relative position of a third point which is not in line with the connecting line between the two points is adjusted to realize adjustment on the angle or position of the two components.

So far, in the automobile lamp structure, different components are used to conduct the distance lighting and near lighting functions. Laws and regulations have specific requirements for the relative position of the high and low beams, so it is needed to perform bidirectional adjustment of the high beam unit or a low beam light.

BRIEF SUMMARY OF THE INVENTION

To solve the above problems, the objective of the present invention is to provide a screw-driving bidirectional adjustment mechanism for adjusting the relative position of the high and low beam shapes of an automobile lamp. The screw-driving bidirectional adjustment mechanism for adjusting the relative position of high and low beam shapes of an automobile lamp adjusts the relative position of the high and low beam shapes of the automobile lamp by performing bidirectional adjustment on a high beam unit or a low beam unit of the automobile lamp, meeting the demands of sites with specific requirements for the relative position of the high and low beam shapes of the automobile lamp.

The principle of the present invention is as follows:

An open box-shaped sliding groove fixedly connected with a low beam assembly unit and a high beam assembly unit which is rotationally fitted with the low beam assembly unit, has one end capable of being moved through a shift lever, and is connected to a sliding block assembly, are provided. The sliding block assembly can slide in the open box-shaped sliding groove in vertical directions through a set of gear-mating structures. By shifting the mating structure of a gear in the open box-shaped sliding groove, the relative displacement of the high beam assembly unit with respect to the low beam assembly unit can be achieved, fulfilling the objective that the relative position of the high and low beam shapes of the automobile lamp conform to the regulatory requirements.

The technical solution of the present invention is as follows.

Disclosed is a screw-driving bidirectional adjustment mechanism for adjusting the relative position of the high and low beam shapes of an automobile lamp. The bidirectional adjustment mechanism includes:

an open box-shaped sliding groove fixedly connected with a low beam assembly unit and a high beam assembly unit which is rotationally fitted with the low beam assembly unit, has one end capable of being moved through a shift lever, and is connected to a sliding block assembly, characterized in that, the open box-shaped sliding groove 8 is internally provided with the sliding block assembly which is capable of respectively sliding in the open box-shaped sliding groove in the vertical direction;

the sliding block assembly comprises:

a sliding block 1 formed with a cavity therein, and a gear 2 disposed in the cavity;

an upper edge in the inner cavity of the sliding block 1 is formed with a rack structure 1a meshed with the gear 2;

a through-hole for bearing a shift lever head 7a of a high beam assembly 10 is formed at the middle portion of the gear 2; the gear 2 is capable of rolling in a first direction, (namely in the length direction of the rack structure 1a, the forward-backward direction in the figure), in the cavity of the sliding block 1 along the rack structure 1a;

on the other side, meshed with the rack structure 1a, of the gear 2, namely the opposite side, the gear 2 is meshed with an adjusting screw 3 which is disposed along the first direction (namely the length direction of the rack structure 1a, forward-backward direction in the figure);

and the adjusting screw 3 is capable of rotating along the axial direction thereof.

Therefore, in virtue of such meshing relationship, by rotating the adjusting screw 3 forward or backward, the gear 2 is capable of being driven to roll along the rack structure 1a; meanwhile, when the shift lever head 7a, which is embedded in the through-hole at the middle portion of the gear 2 and connects the high beam assembly 10, of a shift lever 7 is shifted to move along the first direction (namely the length direction of the rack structure 1a, the forward-backward direction in the figure), the high beam assembly 10 is driven to swing around a pivot point 9a along the horizontal direction.

The screw-driving bidirectional adjustment mechanism for adjusting the relative position of the high and low beam shapes of an automobile lamp according to the present invention is characterized in that, an adjusting screw 5 which is axially vertical to the first direction, namely pointing at a second direction (namely the up-down direction in the figure), and has one end relatively fixed at the sliding groove 8, is formed on the other side (left side in the figure) of the sliding block 1 embedded in the shift lever head 7a.

By rotating the adjusting screw 5 forward or backward, the sliding assembly is capable of being driven to move in the inner cavity of the sliding groove 8 along the axial direction, namely the second direction (namely the up-down direction in the figure), of the adjusting screw 5 to drive the high beam assembly 10 to swing around the pivot point 9a along the second direction.

Therefore, the bidirectional movement of the shift lever head 7a, in connection with the high beam assembly 10, of the shift lever 7 of the screw-driving bidirectional adjustment mechanism is achieved, driving the high beam assembly 10 to swing in the horizontal direction or rotate in the second direction (namely in the up-down direction in the figure) around the pivot point 9a, thereby realizing the adjustment of the relative position of the high and low beam shapes of the automobile lamp.

The screw-driving bidirectional adjustment mechanism for adjusting the relative position of the high and low beam shapes of an automobile lamp according to the present invention is characterized in that, as shown in FIG. 1, the bidirectional adjustment mechanism includes the sliding block 1, the gear 2, the adjusting screw 3, a clamping spring 4, the adjusting screw 5 and a clamping spring 6. An inner cavity of the sliding block 1 is internally provided with a rack structure 1a meshed with the gear 2, and the gear 2 can roll in the direction A along the rack structure 1a. The other side of the gear 2 is meshed with the adjusting screw 3; the adjusting screw 3 is fixed with the sliding block 1 through the clamping spring 4; meanwhile, the adjusting screw 3 can rotate along the axial direction. By rotating the adjusting screw 3 forward or backward, the gear 2 can be driven to roll along the rack structure 1a.

On the other hand, as shown in FIG. 2, the sliding block 1 is provided with a semi-thread structure 1b on the left side, and the semi-thread structure 1b together with the adjusting screw 5 which is also disposed on the left side of the sliding block 1 form a screw thread pair. The adjusting screw 5 is fixed with the sliding block 1 through the clamping spring 6. A recess 5a at the head portion of the adjusting screw 5 is clamped in the upper edge of the sliding groove 8 so that the adjusting screw 5 is axially fixed with respect to the sliding groove 8. By rotating the adjusting screw 5 forward or backward, a sliding block assembly consisting of the sliding block 1, the gear 2, the adjusting screw 3 and the clamping spring 4 can be driven to move in the inner cavity of the sliding groove 8 along the axial direction of the adjusting screw 5, namely the up-down direction of the whole sliding block assembly in FIG. 2. Due to the up-down movement of the whole sliding block assembly, the high beam assembly 10 is driven to move up and down through the shift lever 7 and the shift lever head 7a.

Thus, by the movement of the high beam assembly 10 in the first and second directions, namely the forward-backward direction and the up-down direction in the figures, the screw-driving bidirectional adjustment mechanism of the present invention realizes the adjustment of the relative position of the high beam unit or the low beam unit of the automobile lamp.

The screw-driving bidirectional adjustment mechanism for adjusting the relative position of the high and low beam shapes of an automobile lamp according to the present invention is characterized in that the open box-shaped sliding groove is a rectangular box which opens toward the high beam assembly, and the sliding block in the cavity is a rectangular case which is capable of correspondingly moving up and down in the open box-shaped sliding groove.

The screw-driving bidirectional adjustment mechanism for adjusting the relative position of the high and low beam shapes of an automobile lamp according to the present invention is characterized in that the head portion of the adjusting screw 3 is formed with a recess 3a for clamping the corresponding bottom end of the sliding block 1, and the adjusting screw 3 is installed and fixed at the bottom of the sliding block 1 through a U-shaped clamping spring 4.

The screw-driving bidirectional adjustment mechanism for adjusting the relative position of the high and low beam shapes of an automobile lamp according to the present invention is characterized in that the head portion of the adjusting screw 5 is formed with a recess 5a for clamping the corresponding end of the sliding groove 8, and the adjusting screw 5 is installed and fixed at one side of the sliding block 1 through a U-shaped clamping spring 6.

The screw-driving bidirectional adjustment mechanism for adjusting the relative position of the high and low beam shapes of an automobile lamp according to the present invention is characterized in that a screw pair consisting of the semi-thread structure 1b and the adjusting screw 5 is formed on the other side (left side in the figure) of the sliding block 1 which is embedded in the shift leaver head 7a.

The screw-driving bidirectional adjustment mechanism for adjusting the relative position of the high and low beam shapes of an automobile lamp according to the present invention is characterized in that preferably, the semi-thread structure 1b on the left side of the sliding block 1 is semi-round shaped.

The screw-driving bidirectional adjustment mechanism for adjusting the relative position of the high and low beam shapes of an automobile lamp according to the present invention characterized in that the high beam assembly 10 is a rectangular block at a rotary connecting member which takes the ball head center 9a as the pivot point, and a part, contacting a rotary connecting point of the ball head center 9a, is formed with an arc-shaped contact surface.

The screw-driving bidirectional adjustment mechanism for adjusting the relative position of the high and low beam shapes of an automobile lamp according to the present invention is characterized in that the shift lever 7 and the shift lever head 7a are connected to the high beam assembly 10 in an inclined way, the inclined angle ($\alpha$) being 15-25°.

The screw-driving bidirectional adjustment mechanism for adjusting the relative position of the high and low beam shapes of an automobile lamp according to the present invention is characterized in that the sliding block realizes adjustment of the gear 2 with respect to the sliding groove 8 in direction A and direction B; and when the ball head of the shift lever 7 is mated with an inner hole of the gear 2, finally, the gear 2 drives the shift lever 7 to perform bidirectional adjustment.

The present invention has the following advantages:

1. The gear 2 is driven through screw threads to roll along the direction A, and the gear is fixed by using the self-locking feature of the screw threads.

2. An assembly consisting of the sliding block 1, the gear 2, the adjusting screw 3 and the clamping spring 4, is driven by using the screw threads to slide in the sliding groove 8 along the direction B, and the sliding block 1 is fixed by using the self-locking feature of the screw threads.

As shown in the figures, 1—sliding block; 1a—rack structure; 1b—semi-thread structure disposed on the sliding block 1; 2—gear; 3—adjusting screw; 4—clamping spring; 5—adjusting screw; 5a—recess at the head of the adjusting screw 5; 6—clamping spring; 7—shift lever; 7a—shift lever head; 8—sliding groove; 9—low beam assembly; 9a—ball head center; 9b—sliding groove; 10—high beam assembly; 11—bidirectional adjustment mechanism; F3—low beam shape; F1, F2—high beam shape.

DETAILED DESCRIPTION OF THE INVENTION

The design of the present invention is described in further detail in conjunction with the accompanying drawings.

Embodiment 1

Figure 4:
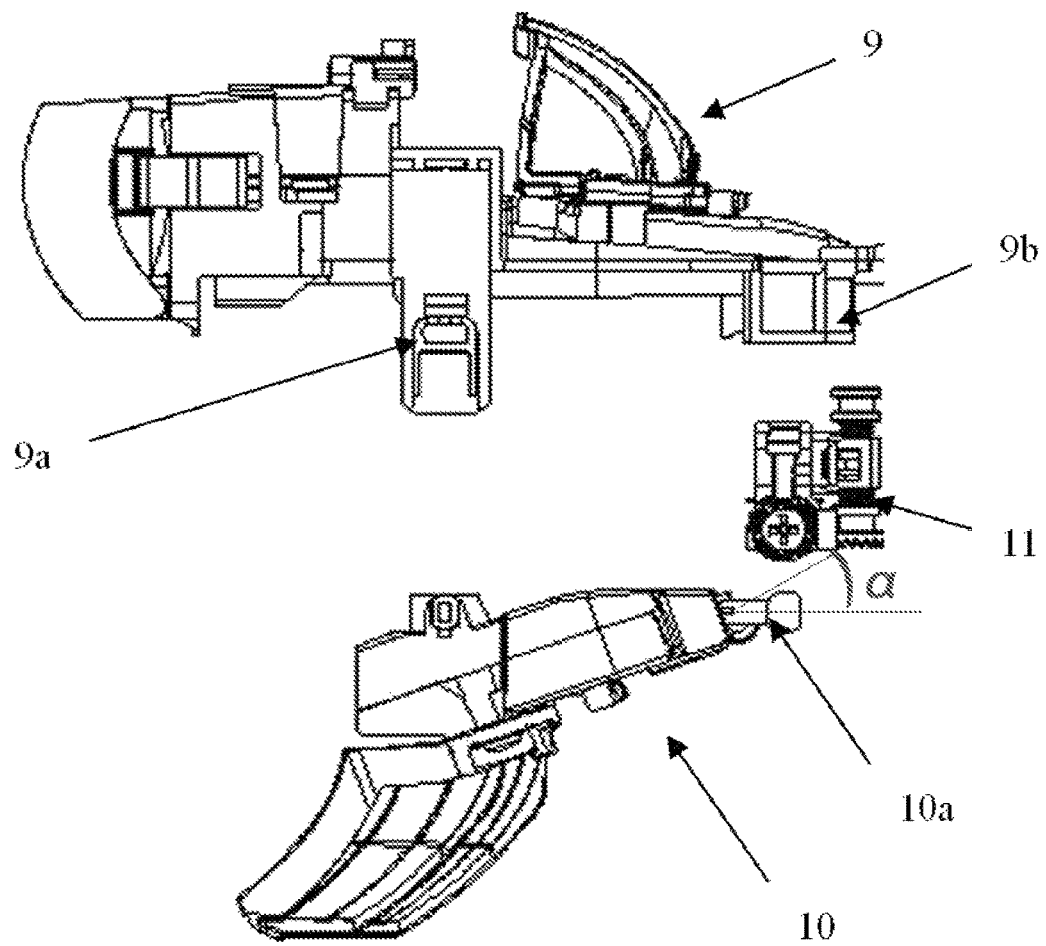
FIG. 4 is a schematic view of structure assembling of the screw-driving bidirectional adjustment mechanism of the present invention in actual use.
Figure 5:
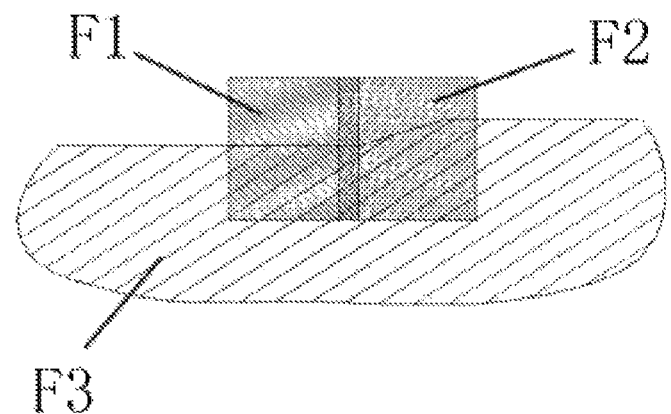
FIG. 5 is a first schematic view of the lighting beam shape of the screw-driving bidirectional adjustment mechanism of the present invention in use.
Figure 6:
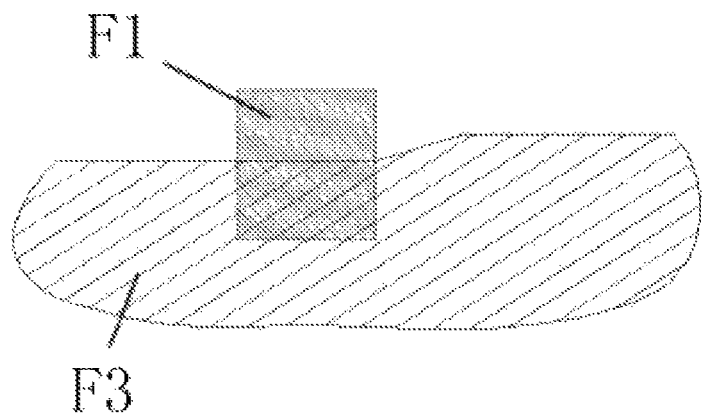
FIG. 6 is a second schematic view of the lighting beam shape of the screw-driving bidirectional adjustment mechanism of the present invention in use.
Figure 7:
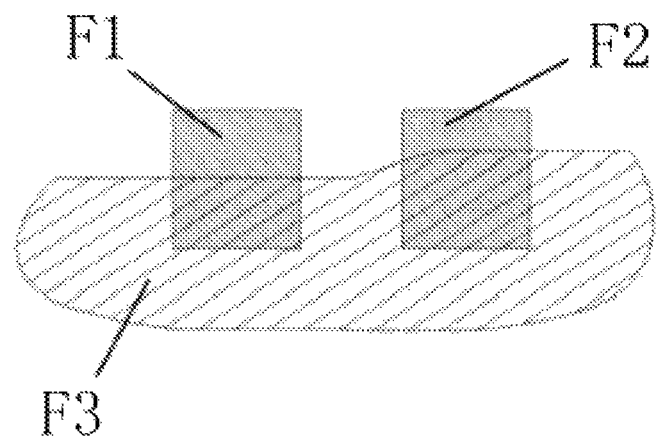
FIG. 7 is a third schematic view of the lighting beam shape of the screw-driving bidirectional adjustment mechanism of the present invention in use.

As shown in FIG. 4, a low beam assembly 9 is used for generating a low beam shape F3, and a high beam assembly 10 is used for generating high beam shapes F1 and F2. The high beam assembly 10 can rotate bidirectionally by taking a ball head center 9a of the low beam assembly 9 as the rotating center. The bidirectional adjustment mechanism 11 can slide up and down in a sliding groove 9b. By using the center hole of a gear 2 in the bidirectional adjustment mechanism 11 to shift a ball head 7a of the high beam assembly 10 to move bidirectionally, the objective of adjusting the relative position of the high beam shape and the low beam shape is achieved.

Figure 1A:
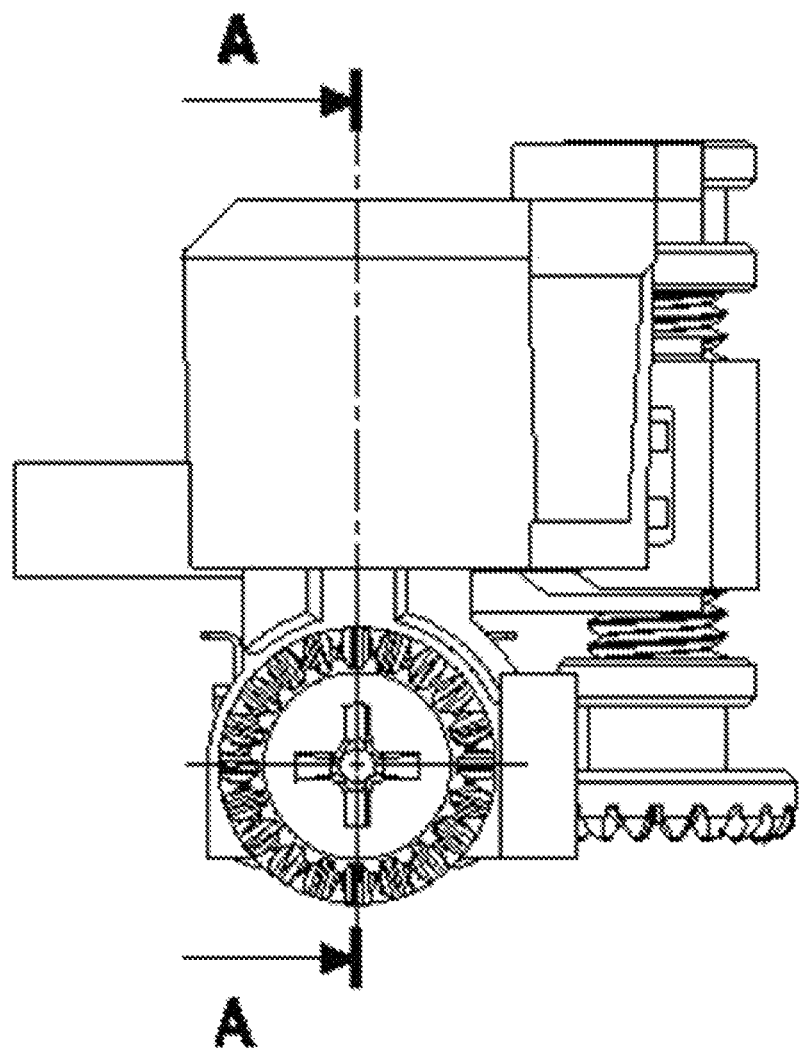
FIG. 1A is a front view a screw-driving bidirectional adjustment mechanism of the present invention.
Figure 1B:
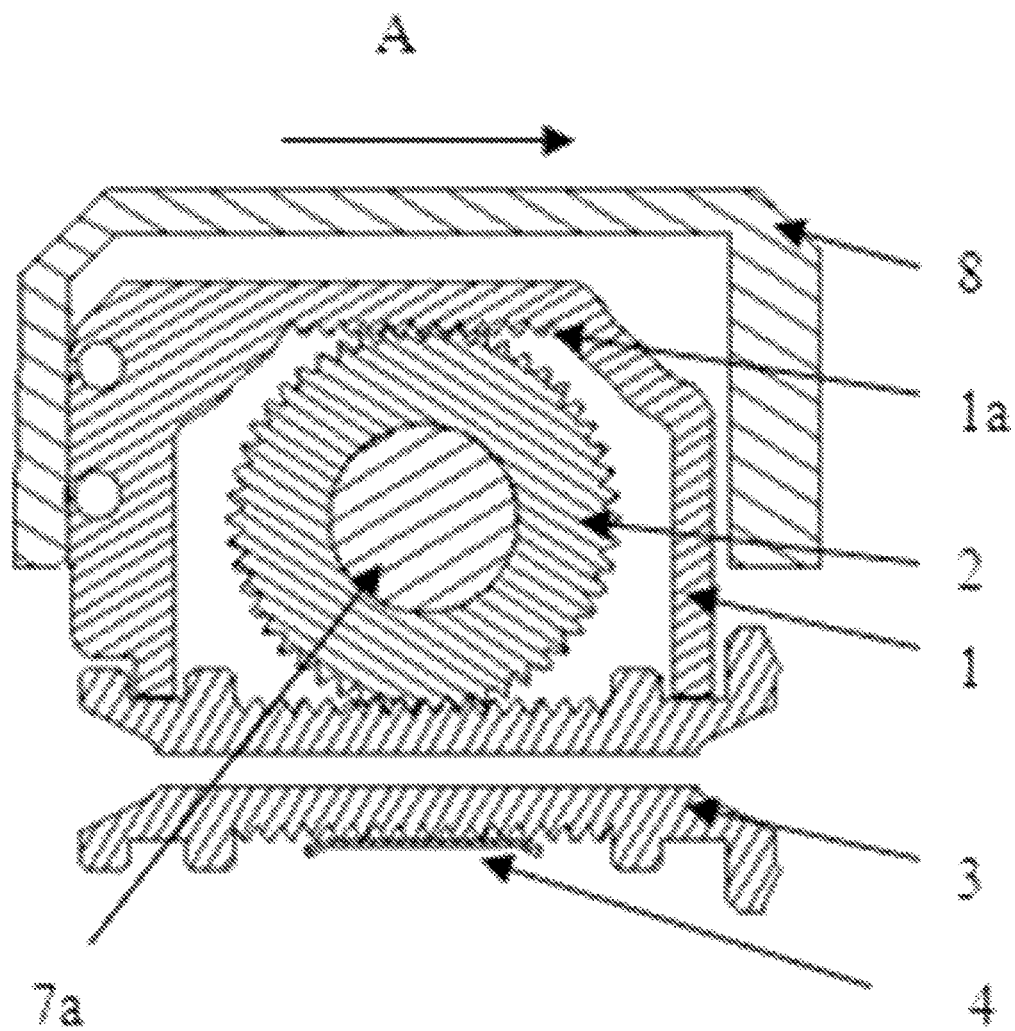
FIG. 1B is a sectional view of a screw-driving bidirectional adjustment mechanism of the present invention.

As shown in FIG. 1, the bidirectional adjustment mechanism includes a sliding block 1, the gear 2, an adjusting screw 3, a clamping spring 4, an adjusting screw 5 and a clamping spring 6. An inner cavity of the sliding block 1 is internally provided with a rack structure 1a meshed with the gear 2, and the gear 2 can roll in direction A along the rack structure 1a. The other side of the gear 2 is meshed with the adjusting screw 3; the adjusting screw 3 is fixed with the sliding block 1 through the clamping spring 4; meanwhile, the adjusting screw 3 can rotate along the axial direction. By rotating the adjusting screw 3 forward or backward, the gear 2 can be driven to roll along the rack structure 1a.

Figure 2A:
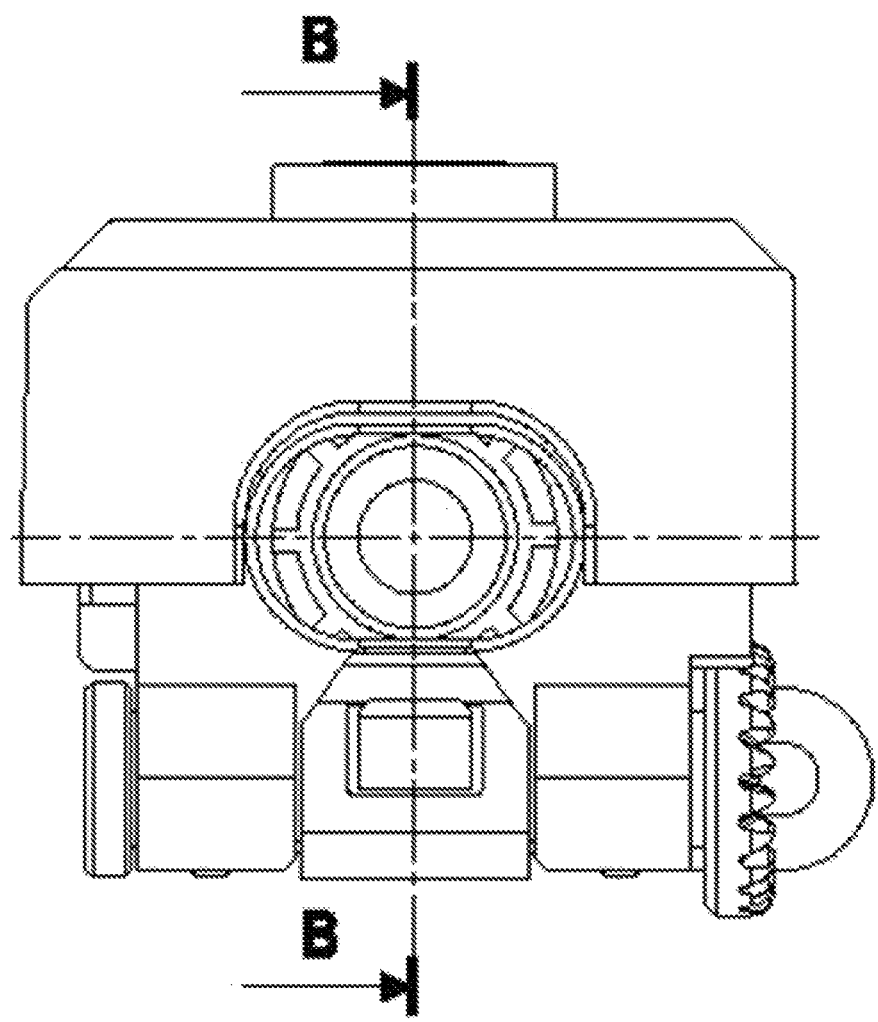
FIG. 2A is a left view of a structural diagram of the screw-driving bidirectional adjustment mechanism of the present invention.
Figure 2B:
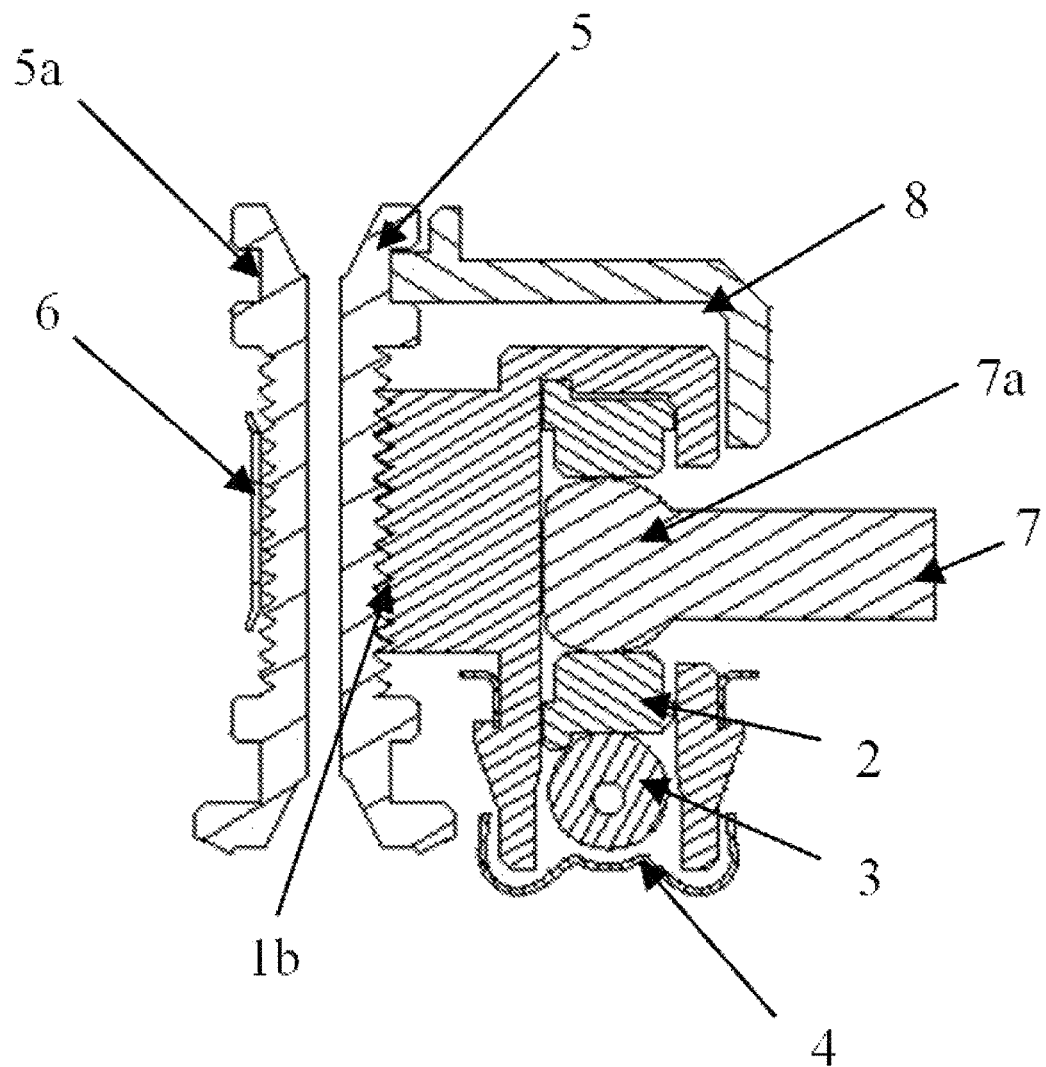
FIG. 2B is a sectional view of a structural diagram of the screw-driving bidirectional adjustment mechanism of the present invention.
Figure 3:
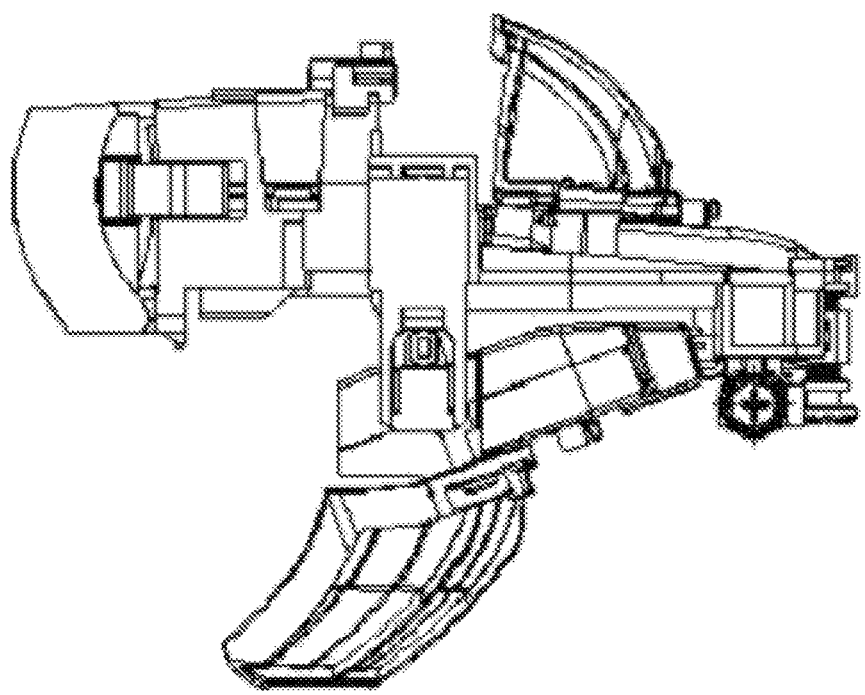
FIG. 3 is a three-dimensional view of the screw-driving bidirectional adjustment mechanism of the present invention in actual use.

As shown in FIG. 2, the sliding block 1 is provided with a semi-thread structure 1b, and the semi-thread structure 1b together with the adjusting screw 5 forms a screw thread pair. The adjusting screw 5 is fixed with the sliding block 1 through the clamping spring 6. A recess 5a at the head portion of the adjusting screw 5 is clamped in the sliding groove 8 so that the adjusting screw 5 is axially fixed with respect to the sliding groove 8. By rotating the adjusting screw 5 forward or backward, an assembly consisting of the sliding block 1, the gear 2, the adjusting screw 3 and the clamping spring 4 can be driven to move in the sliding groove 8 along the axial direction B of the adjusting screw 5. The shift lever 7 and the shift lever head 7a are connected to the high beam assembly 10 in an inclined way, at an inclined angle ($\alpha$) of 15°.

Thus, the adjustment of the gear 2 with respect to the sliding groove 8 in direction A and direction B is achieved, and when the ball head of the shift lever 7 is mated with an inner hole of the gear 2, finally, the gear 2 drives the shift lever 7 to realize bidirectional adjustment.

What is claimed is:

1. A screw-driving bidirectional adjustment mechanism for adjusting the relative position of the high and low beam shapes of an automobile lamp, said bidirectional adjustment mechanism comprising:

an open box-shaped sliding groove (8) fixedly connected with a low beam assembly unit (9) and a high beam assembly unit (10) which is rotationally fitted with the low beam assembly unit (9), has one end capable of being moved through a shift lever (7), and is connected to a sliding block assembly, characterized in that, the open box-shaped sliding groove (8) is internally provided with a sliding block assembly which is capable of respectively sliding in the open box-shaped sliding groove (8) in the directions vertical to each other;

the sliding block assembly comprises:

a sliding block (1) formed with a cavity therein, and a gear (2) disposed in the cavity;

an upper edge in the inner cavity of the sliding block (1) is formed with a rack structure (1a) meshed with the gear (2);

a through-hole for bearing a shift lever head (7a) of a high beam assembly (10) is formed at the middle portion of the gear (2); the gear (2) is capable of rolling in a length direction of the rack structure (1a), in the cavity of the sliding block (1) along the rack structure (1a);

on the other side, meshed with the rack structure (1a) of the gear (2), the gear (2) is meshed with an adjusting screw (3) which is disposed along the length direction of the rack structure (1a);

the adjusting screw (3) is capable of rotating along the axial direction thereof;

in this way, by such meshing relationship, by rotating the adjusting screw (3) forward or backward, the gear (2) is capable of being driven to roll along the rack structure (1a); meanwhile, when the shift lever head (7a) of a shift lever (7) which is embedded into the through-hole in the middle portion of the gear (2) and connects the high beam assembly (10) is shifted to move along the length direction of the rack structure (1a), the high beam assembly (10) is driven to swing around a pivot point (9a) along the horizontal direction.

2. The screw-driving bidirectional adjustment mechanism for adjusting the relative position of the high and low beam shapes of an automobile lamp according to claim 1, characterized in that, an adjusting screw (5) which is axially vertical to the length direction of the rack structure (1a) and has one end relatively fixed at the sliding groove (8), is formed on the other side of the sliding block (1) which is embedded in the shift lever head (7a);

by rotating the adjusting screw (5) forward or backward, the sliding assembly is capable of being driven to move in the inner cavity of the sliding groove (8) along the axial direction of the adjusting screw 5, to drive the high beam assembly (10) to swing around the pivot point (9a) along the second direction.

3. The screw-driving bidirectional adjustment mechanism for adjusting the relative position of the high and low beam shapes of an automobile lamp according to claim 1, characterized in that the open box-shaped sliding groove (8) is a rectangular box which opens toward the high beam assembly, and the sliding block (1) in the cavity is a rectangular case which is capable of correspondingly moving up and down in the open box-shaped sliding groove.

4. The screw-driving bidirectional adjustment mechanism for adjusting the relative position of the high and low beam shapes of an automobile lamp according to claim 1, characterized in that the head portion of the adjusting screw (3) is formed with a recess (3a) for clamping the corresponding bottom end of the sliding block (1), and the adjusting screw (3) installed and fixed at the bottom of the sliding block (1) through a U-shaped clamping spring (4).

5. The screw-driving bidirectional adjustment mechanism for adjusting the relative position of the high and low beam shapes of an automobile lamp according to claim 1, characterized in that the head portion of the adjusting screw 5 is formed with a recess (5a) for clamping the corresponding end of the sliding groove (8), and the adjusting screw 5 is installed and fixed at one side of the sliding block (1) through a U-shaped clamping spring (6).

6. The screw-driving bidirectional adjustment mechanism for adjusting the relative position of the high and low beam shapes of an automobile lamp according to claim 1, characterized in that a screw pair consisting of a semi-thread structure (1b) and the adjusting screw (5) is formed on the other side of the sliding block (1) which is embedded in the shift lever head (7a).

7. The screw-driving bidirectional adjustment mechanism for adjusting the relative position of the high and low beam shapes of an automobile lamp according to claim 1, characterized in that, the semi-thread structure (1b) on the left side of the sliding block (1) is semi-round shaped.

8. The screw-driving bidirectional adjustment mechanism for adjusting the relative position of the high and low beam shapes of an automobile lamp according to claim 1, characterized in that the high beam assembly (10) is a rectangular block at a rotary connecting member which takes a ball head center 9a as the pivot point, and a part, contacting a rotary connecting point of ball head center (9a), is formed with an arc-shaped contact surface.

9. The screw-driving bidirectional adjustment mechanism for adjusting the relative position of the high and low beam shapes of an automobile lamp according to claim 1, characterized in that the shift lever (7) and the shift lever head (7a) are connected to the high beam assembly (10) in an inclined way, the inclined angle ($\alpha$) being 15-25°.

10. The screw-driving bidirectional adjustment mechanism for adjusting the relative position of the high and low beam shapes of an automobile lamp according to claim 1, characterized in that the sliding block realizes adjustment of the gear (2) relative to the sliding groove (8) in direction A and direction B; and when the ball head of the shift lever (7) is mated with an inner hole of the gear (2), finally, the gear (2) drives the shift lever (7) to perform bidirectional adjustment.

* * * * *